US012065235B2

(12) United States Patent
Commis et al.

(10) Patent No.: US 12,065,235 B2
(45) Date of Patent: Aug. 20, 2024

(54) LEADING EDGE SLAT

(71) Applicant: Airbus Operations Limited, Bristol (GB)

(72) Inventors: Ben Commis, Bristol (GB); Neil Lyons, Bristol (GB); Edmund Kay, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 104 days.

(21) Appl. No.: 17/773,362

(22) PCT Filed: Oct. 26, 2020

(86) PCT No.: PCT/EP2020/079998
§ 371 (c)(1),
(2) Date: Apr. 29, 2022

(87) PCT Pub. No.: WO2021/083821
PCT Pub. Date: May 6, 2021

(65) Prior Publication Data
US 2023/0286647 A1    Sep. 14, 2023

(30) Foreign Application Priority Data

Oct. 31, 2019   (GB) ...................................... 1915796

(51) Int. Cl.
*B64C 21/02* (2006.01)
(52) U.S. Cl.
CPC .................................... *B64C 21/02* (2013.01)

(58) Field of Classification Search
CPC ........... B64C 21/02; B64C 21/08; B64C 9/24; B64C 9/26; B64C 3/50
See application file for complete search history.

(56) References Cited

U.S. PATENT DOCUMENTS

| 5,544,847 | A | * | 8/1996 | Bliesner | .................... | B64C 9/24 244/214 |
| 5,839,699 | A | * | 11/1998 | Bliesner | .................... | B64C 9/24 244/214 |
| 6,135,395 | A | * | 10/2000 | Collett | ...................... | B64C 9/22 244/209 |
| 2011/0049305 | A1 | * | 3/2011 | Kafyeke | ................... | B64C 9/24 244/214 |
| 2020/0198760 | A1 | * | 6/2020 | Leopold | .................. | B64C 21/00 |

OTHER PUBLICATIONS

Communication Pursuant to Article 94(3) EPC, mailed Nov. 2, 2023, 4 pages.

* cited by examiner

*Primary Examiner* — Tye William Abell
(74) *Attorney, Agent, or Firm* — Nixon & Vanderhye P.C.

(57) ABSTRACT

An aircraft wing including a leading edge slat and a fixed aerofoil portion. The leading edge slat is moveable between a stowed position and deployed position. In the deployed position a trailing edge of the leading edge slat includes a sealed portion and an unsealed portion. The sealed portion forms a seal with the fixed aerofoil portion and the unsealed portion provides an airflow gap between the leading edge flap and the fixed aerofoil portion. The invention provides substantially the same benefits as a sealed leading edge slat whilst improving stall control behavior in local zones around the unsealed portion.

14 Claims, 9 Drawing Sheets

LEADING EDGE SLAT

RELATED APPLICATION

This application is the U.S. national phase of International Application No. PCT/EP2020/079998, filed Oct. 26, 2020, which designated the U.S. and claims priority to United Kingdom patent application GB 1915796.5, filed Oct. 31, 2019, the entire contents of each of these applications are hereby incorporated by reference.

TECHNICAL FIELD

The present invention concerns a leading edge slat for an aircraft wing. The present invention also concerns an aircraft wing, and an aircraft comprising an aircraft wing, with a leading edge slat. The leading edge slat may be configured to reduce drag in some locations across the aircraft wing, and assist in controlling stall behaviour at other locations.

BACKGROUND OF THE INVENTION

Leading edge slats are provided on aircraft wings to increase the lift provided by an aircraft wing during take off and/or landing. Leading edge slats are typically provided with a stowed position, in which the leading edge slat sits during normal flight operations, and a deployed position into which the leading edge slat is moved for take off and/or landing.

It is known to provide leading edge slats with seals, such that in the deployed position the leading edge slat is sealed against the main aerofoil structure of the wing. Such an arrangement is shown in U.S. Pat. No. 8,899,528B2. Providing a sealed leading edge slat may reduce the drag created by the leading edge slat when in the deployed position, which may also reduce the noise generated during take off and/or landing, and also have fuel efficiency benefits. However, there are also benefits to unsealed leading edge slats, which may provide better stall control benefits than sealed leading edge slats. At present, the choice between a sealed leading edge slat and unsealed leading edge slat represents a compromise.

The present invention seeks to mitigate one or more of the above-mentioned problems.

SUMMARY OF THE INVENTION

According to a first aspect, the invention provides an aircraft wing comprising a leading edge slat and a fixed aerofoil portion, the leading edge slat moveable between a stowed position and deployed position, wherein in the deployed position a trailing edge of the leading edge slat comprises a sealed portion and an unsealed portion, the sealed portion forming a seal with the fixed aerofoil portion and the unsealed portion providing an airflow gap between the leading edge flap and the fixed aerofoil portion.

The sealed portion may extend across at least 75%, 80%, 85%, 90%, or 95%, of the trailing edge of the leading edge slat. The direction in which the seal portion extends may be spanwise along the leading edge slat.

The leading edge slat may comprise an inboard end and an outboard end, the inboard end located towards the root of the aircraft wing and the outboard end located towards the tip of the aircraft wing. The unsealed portion may be located at the inboard end or outboard end of the leading edge slat.

The aircraft wing may comprise a seal located to provide the sealed portion of the leading edge slat. The seal may be situated on one or both of the leading edge slat and the fixed aerofoil portion. In an alternative arrangement, the sealed portion may simply comprise part of the leading edge slat and part of the fixed aerofoil portion remaining in contact, such that a sealed portion is provided.

The unsealed portion may comprise the trailing edge of the leading edge slat being manipulated to create the airflow gap. For example, the trailing edge of the leading edge slat may be stepped to create an airflow gap. Alternatively or additionally, the profile of the fixed aerofoil portion may be manipulated to create the airflow gap. For example, the profile of the fixed aerofoil portion may be stepped or reduced in order to create the airflow gap.

The leading edge slat may be fully sealed against the fixed aerofoil portion when in the stowed position. By fully sealed it is meant that the leading edge slat is sealed along 100% of the span of the leading edge slat. The aircraft wing may comprise a seal configured to seal the leading edge slat in the stowed position.

The unsealed portion may be configured to manipulate the airflow between the trailing edge of the leading edge slat and the associated portion of the fixed aerofoil structure. For example, the unsealed portion may comprise one or more vortex generators.

The unsealed portion may be located adjacent to, or proximate to, part of the aircraft wing which disrupts airflow. For example, such a part may be a wing tip device or a wing-mounted engine. The inventors have realised that the benefits of a sealed leading edge slat may be reduced or eliminated at wing locations such as at a wing tip device or engine mounting. Such locations may also be potential stall points for air flow. The provision of the unsealed portion adjacent to, or proximate to, such locations has been found to improve the stall characteristics proximate to local aircraft wing structures.

The deployed position may be a take-off position. There may be a further position in which the leading edge slat is deployed such that no seal is created between the leading edge slat and the fixed aerofoil portion. Such a position may be a landing position. The stowed position may be a "normal flight" position, for example the leading edge slat may be stowed during cruising flight of the aircraft.

According to a second aspect, the invention provides an aircraft comprising an aircraft wing according to the first aspect of the invention.

According to a third aspect, the invention provides a leading edge slat for an aircraft wing according to the first aspect of the invention.

The aircraft may be a passenger aircraft. The passenger aircraft may comprise a passenger cabin comprising a plurality of rows and columns of seat units for accommodating a multiplicity of passengers. The aircraft may have a capacity of at least 20, at least 50 passengers, or at more than 50 passengers. The aircraft may be a powered aircraft. The aircraft may comprise an engine for propelling the aircraft. The aircraft may comprise wing-mounted, for example, underwing, engines.

It will of course be appreciated that features described in relation to one aspect of the present invention may be incorporated into other aspects of the present invention. For example, the method of the invention may incorporate any of the features described with reference to the apparatus of the invention and vice versa.

The term 'or' shall be interpreted as 'and/or' unless the context requires otherwise.

DESCRIPTION OF THE DRAWINGS

Embodiments of the present invention will now be described by way of example only with reference to the accompanying schematic drawings of which.

DETAILED DESCRIPTION

Figure 1:
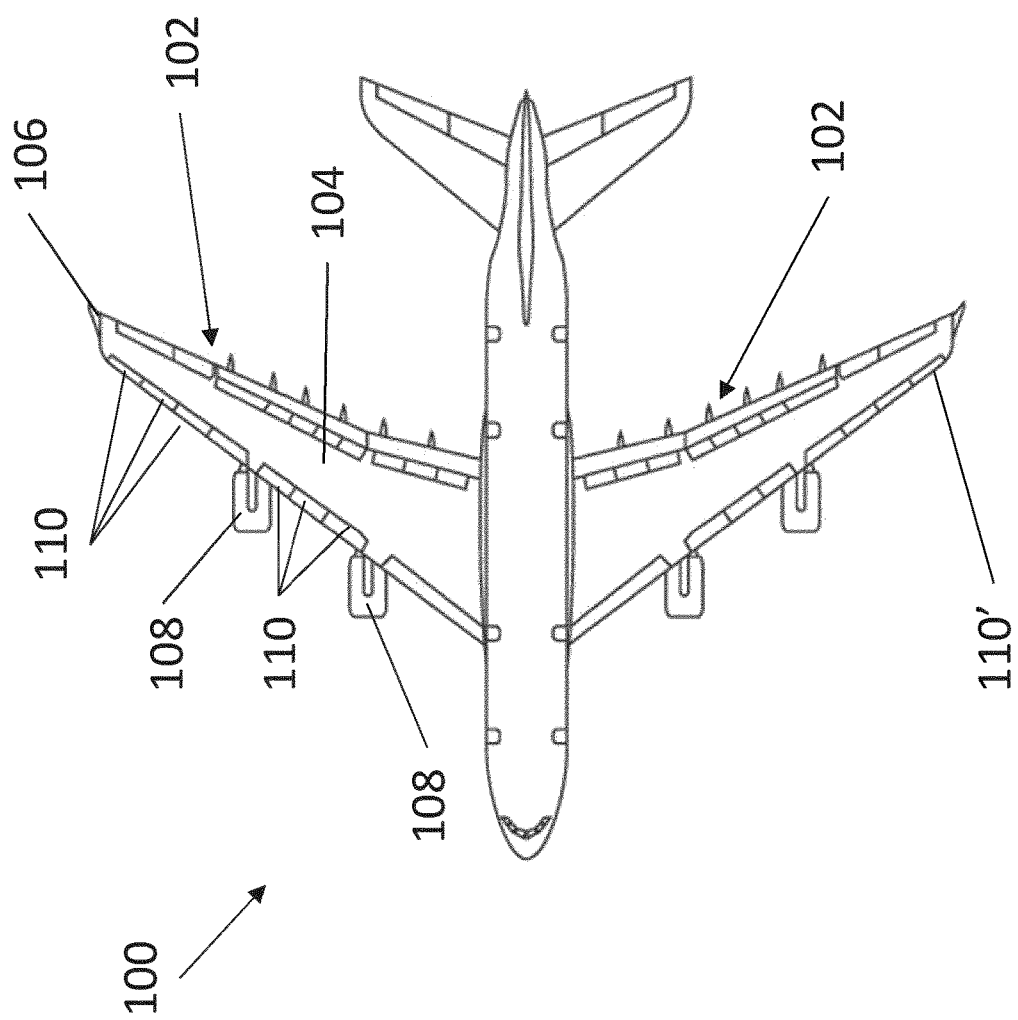
FIG. 1 shows an aircraft with an aircraft wing comprising a first embodiment of the invention.

FIG. 1 shows an aircraft 100. The aircraft 100 comprises first and second aircraft wings 102. As the aircraft wings 102 are mirrors of each other, only elements relating to a single wing 102 will be described. A skilled person will understand that the elements described with regards to one wing are found mirrored on the other wing 102. The wing 102 comprises a main body 104 and a wing tip device 106. The main body 104 is a conventional fixed aerofoil portion of the aircraft wing 102. The wing tip device 106 may be movable to reduce the wing span of the aircraft 100, or it may be fixed. Two under wing engines 108 are mounted to the wing 102. A plurality of leading edge slats 110 are provided at the leading edge of the wing 102. As is conventional, and would be easily understood by a skilled person, the leading edge slats 110 have a deployed position, in which they are moved forwards and often downwards relative to the overall wing 102, such that they create a higher lift wing 102 than when the leading edge slats 110 are in a stowed position, flush with the overall wing 102. The leading edge slats 110 are moved into the deployed position when taking off or landing the aircraft 100, to allow a sharper angle of attack for those manoeuvres. Once the aircraft 100 has taken off and is climbing less steeply, or has entered a level flying state, the leading edge slats 110 are moved into the stowed position to reduce drag compared to the deployed position, thereby allowing more efficient flight. The leading edge slats 110 may remain in the stowed position during the initial stages of a descent, only being moved into the deployed position as the angle of descent increases to a certain value, or the speed of the aircraft is reduced sufficiently. Various different actuators and actuation methods may be used to move the leading edge slats 110 between the deployed and stowed positions, as would be well understood by the skilled person. As such, no further description of the actuators or actuation methods will be provided.

Figure 2:
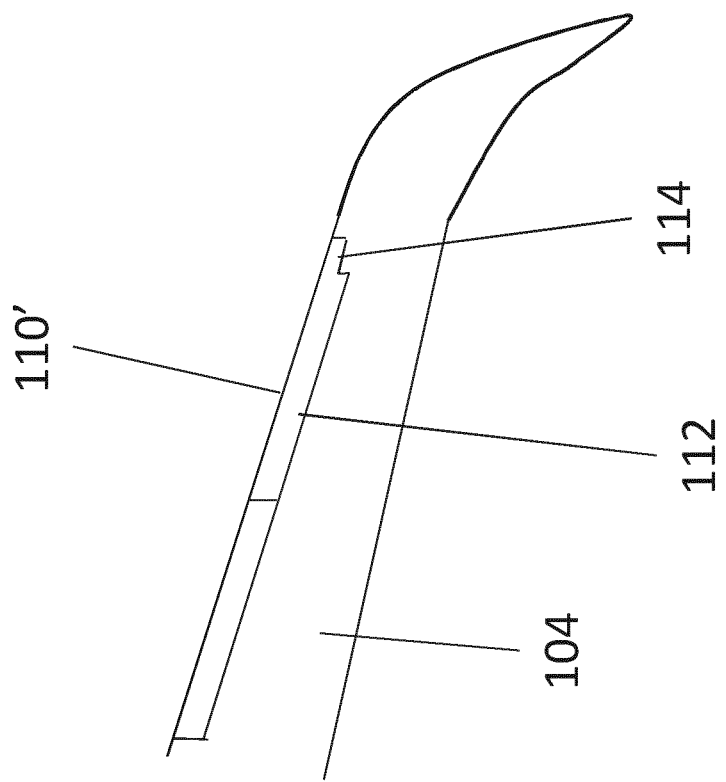
FIG. 2 shows a plan view of a portion of an aircraft wing as shown in FIG. 1.
Figure 3:
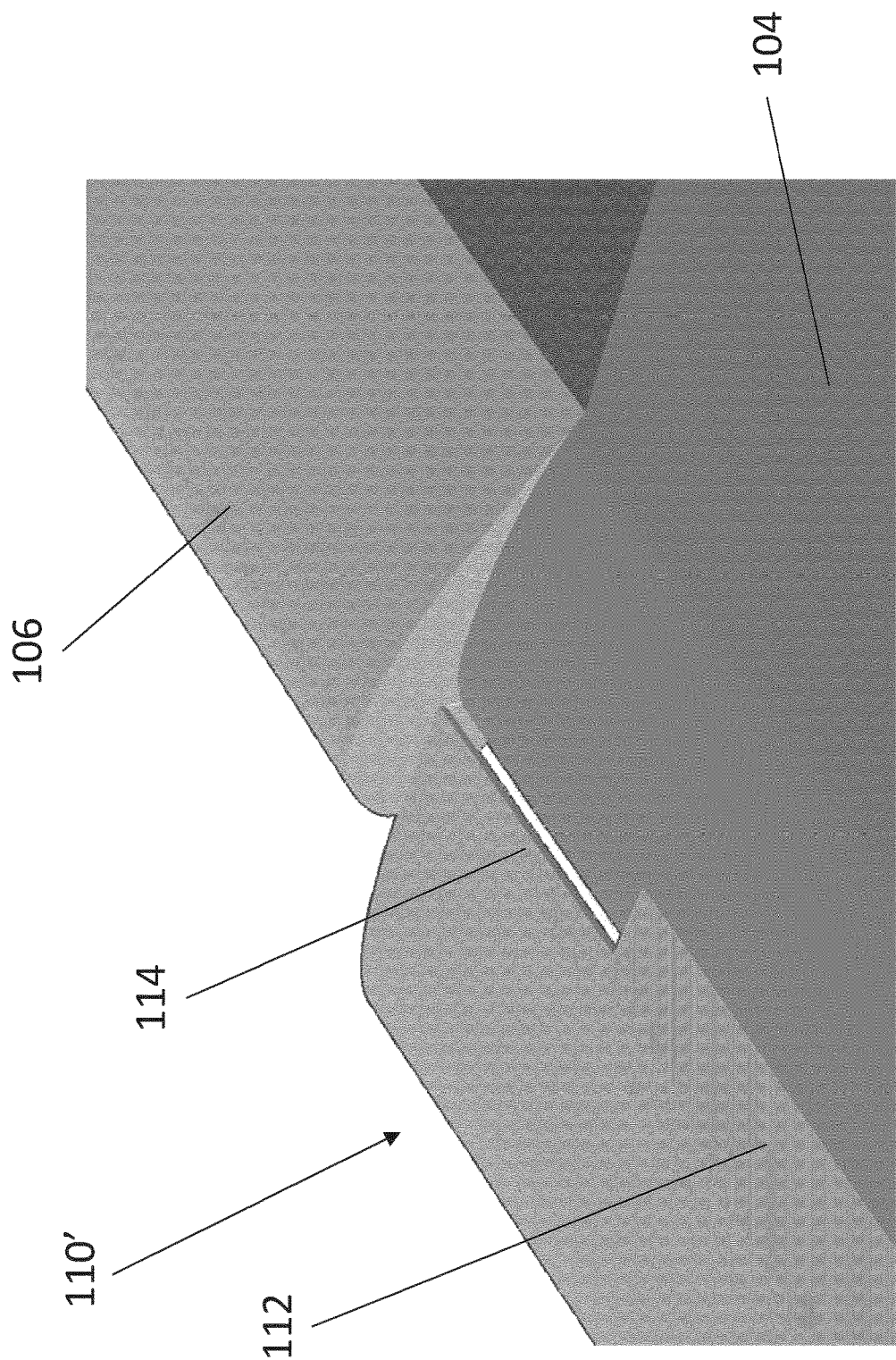
FIG. 3 shows a schematic view of the aircraft wing shown in FIG. 2.

As can be seen, the leading edge slats 110 extend across the majority of the leading edge of the wing. This results in portions of the leading edge slats 110 being located proximate to potential stall points where airflow may be disrupted moving over the wing. Such points include proximate to the under wing engines 108 and where the wing tip device 106 joins the main body 104. FIG. 2 shows a section of a leading edge slat 110' that is located at the distal end of the wing 102, at the point the wing tip device 106 joins the main body 104. In FIG. 2 the leading edge slat 110' is in the stowed position. FIG. 3 shows a perspective view of leading edge slat 110' in the deployed position. The leading edge slat 110' is divided into two portions, a sealed portion 112 and an unsealed portion 114. When the leading edge 110' is in the deployed position, the sealed portion 112 is sealed against the main body 104. Sealed leading edge slats may provide advantages such as reduced drag compared to leading edge slats that are not sealed, reduced fuel consumption, and/or reduced noise. When the leading edge 110' is in the deployed position, the unsealed portion is not sealed against the main body 104 and provides an airflow gap 116 between the leading edge 110' and the main body 104. The airflow gap 116 may result in an accelerated air flow through the airflow gap which results in improved airflow local to the airflow gap. However, as the airflow gap is only present at a specified part of the leading edge slat 110' the benefits of providing a sealed leading edge slat are generally maintained. In the embodiment shown in FIG. 2, it can be seen that the unsealed portion 114 is created by reduction in the chord of the leading edge slat 110', such that in the deployed position the trailing edge of the leading edge slat 110' does not make contact with the main body 104. In contrast, the trailing edge of the sealed portion 112 of the leading edge slat 110' does make contact with the main body 104 when in the deployed position. One or more seal strips or elements may be provided extending from the leading edge slat 110' or the main body 104 to ensure a good seal between the sealed portion 112 of the leading edge slat 110' and the main body 104. Alternatively, the seal may be provided by direct contact between the leading edge slat 110' and the main body 104.

In order to maintain the benefits of a sealed leading edge slat, the unsealed portion 114 makes up a small proportion of the leading edge slat 110'. For example, the unsealed portion may comprise around 10% of the span of the leading edge portion 110', with the remaining 90% being made up by the sealed portion 112. The skilled person will appreciate that the benefits of the invention may still result with the unsealed portion 114 making up from 5% to 25% of the span of the leading edge portion 110' with the sealed portion 112 making up the remainder.

The leading edge slat 110' is shaped such that when in the stowed position all of the trailing edge of the slat is sealed against the main body 104. This may also require suitable shaping of the main body 104, or the provision of distinct seal strips or elements, to allow this.

Figure 4:
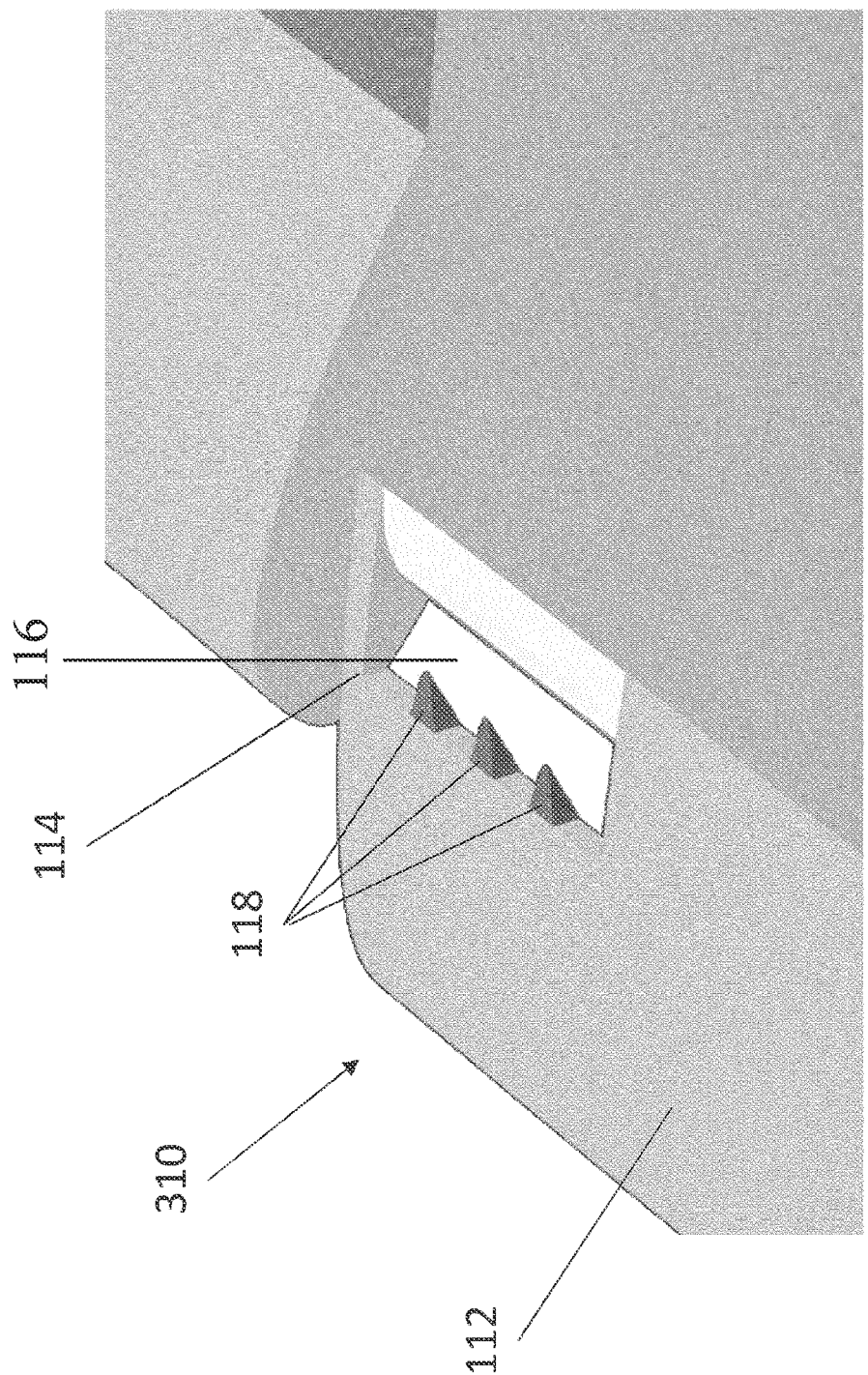
FIG. 4 shows a variation of the first embodiment of the invention.

FIG. 4 shows an alternative embodiment, similar in substance to the embodiment described with reference to FIGS. 1 to 3. Where similar elements are provided, the same reference numerals have been used. The difference shown in FIG. 4 is that the unsealed portion 114 of the leading edge slat 310 further comprises three vortex generators 118. The vortex generators may further improve the airflow at the point where the main body 104 meets the wing tip device 106.

Figure 5:
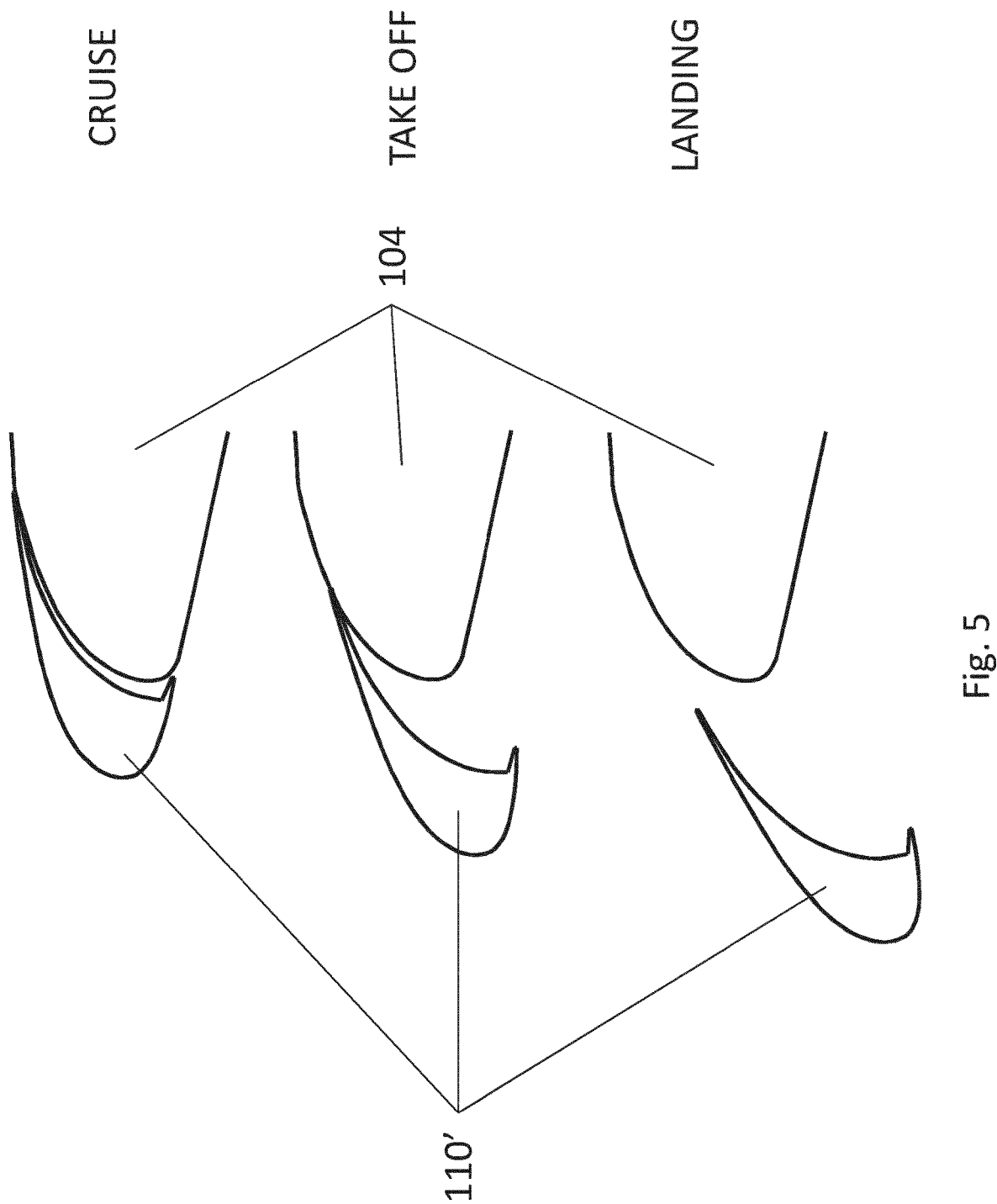
FIG. 5 shows a cross-sectional view of a sealed portion of a wing according to the first embodiment of the invention.

FIG. 5 shows a cross-sectional view, taken perpendicular to the front edge of the leading edge slat, of a sealed portion of a wing according to the first embodiment of the invention.

The initial view shows the stowed position and how the leading edge slat 110' is located relative to the main body 104. The second view shows the leading edge slat 110' in a deployed take-off position. The trailing edge of the leading edge slat 110' remains in contact with the main body 104. The third view shows the leading edge slat 110' in a deployed landing position. In this case, the trailing edge of the leading edge slat is not in contact with the fixed aerofoil portion, the leading edge slat 110' having been extended beyond the deployed take-off position.

Figure 6:
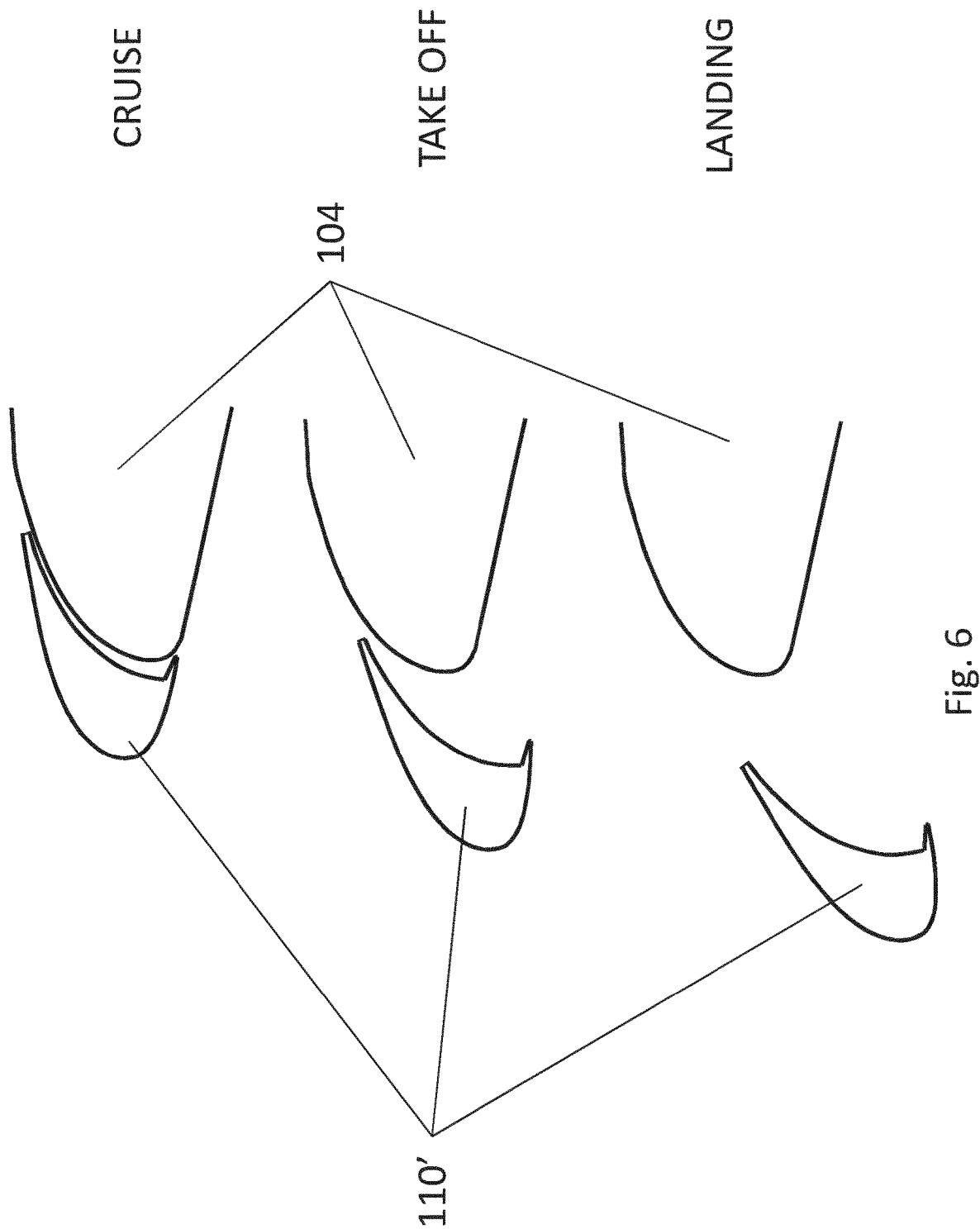
FIG. 6 shows a cross-sectional view of an unsealed portion of a wing according to the first embodiment of the invention.

FIG. 6 shows a cross-sectional view, taken perpendicular to the front edge of the leading edge slat, of an unsealed portion of a wing according to the first embodiment of the invention. The initial view shows the leading edge slat in a stowed position, with the trailing edge of the leading edge slat 110' in contact with the main body 104. The second view shows the leading edge slat in a deployed take-off position, with a clear gap between the trailing edge of the leading edge slat 110' and the main body 104. In this case, the main body 104 has a consistent cross-section across the whole length of the leading edge slat 110 and the leading edge slat 110 includes a removed section in order to provide the unsealed portion. A consistent cross-section does not imply that the cross-section is identical, as the main body will taper in size as it moves out in a span wise direction, rather a consistent cross-section means that that any such taper is smoothly graduated. The third view shows the leading edge slat 110 in a deployed landing position. As in FIG. 5, there is a clear gap between the trailing edge of the leading edge slat 110' and the main body 104.

Figure 7:
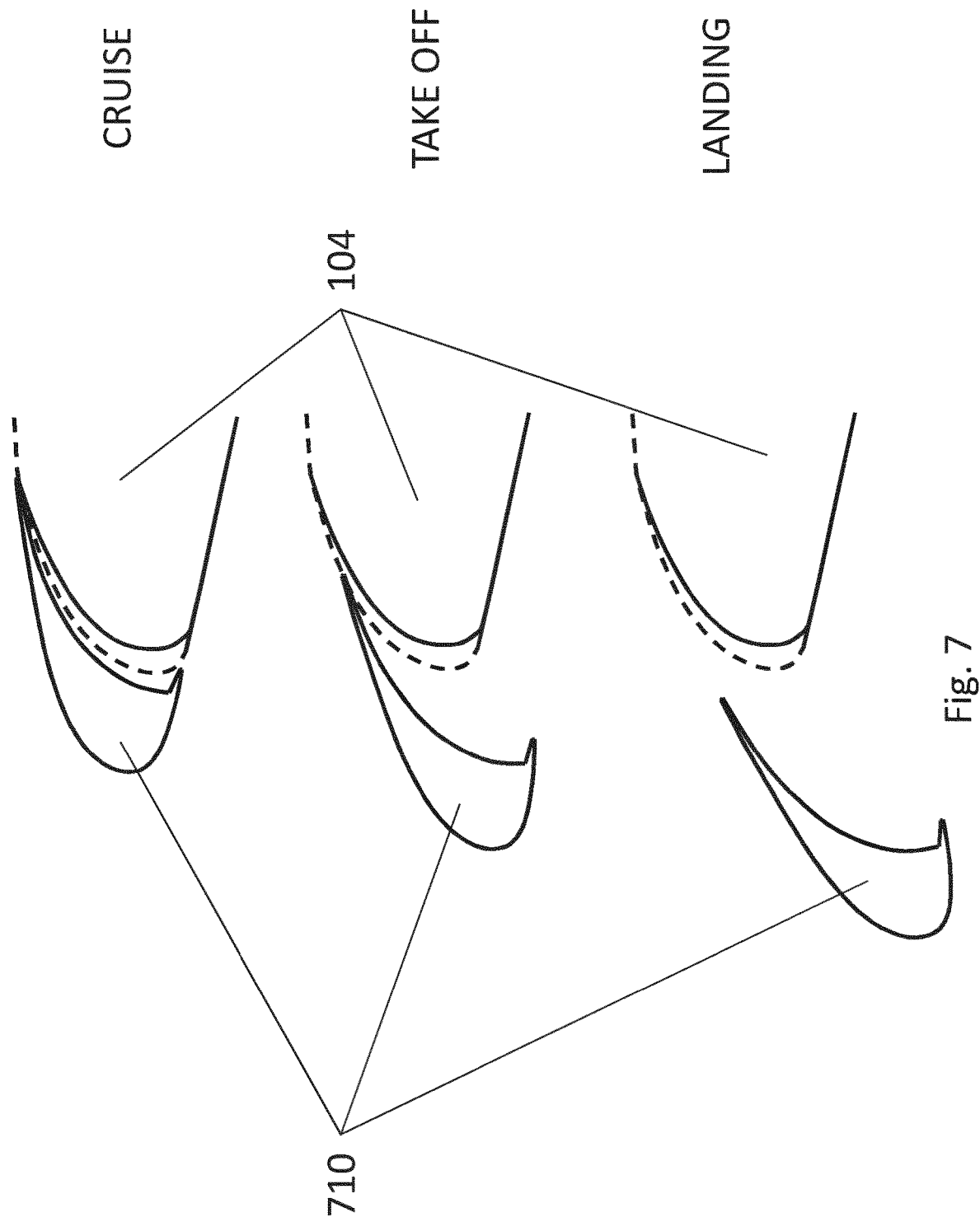
FIG. 7 shows a cross-sectional view of an unsealed portion of a wing according to the second embodiment of the invention.

FIG. 7 shows a cross-sectional view, taken perpendicular to the front edge of the leading edge slat, of an unsealed portion of a wing according to a second embodiment of the invention. In this embodiment, the unsealed portion is created by shaping the main body 104 to provide a gap between the main body and the leading edge flap 710. The dashed line represents the cross-sectional profile of the main body 104 across the sealed portion of the leading edge slat 710, and is as shown with reference to FIG. 5. It can be seen that in the take-off position, the trailing edge of the leading edge slat 710 remains in contact with the main body 104. As can be better seen in FIG. 9, the trailing edge of the leading edge slat 710 is consistently shaped across the whole of the length of the leading edge slat 710, in contrast to the first embodiment. The initial view shows the leading edge slat in a stowed position, with the trailing edge of the leading edge slat 710 in contact with the main body 104. The second view shows the leading edge slat in a deployed take-off position, with a clear gap between the trailing edge of the leading edge slat 710 and the main body 104. The third view shows the leading edge slat 710 in a deployed landing position. As in FIG. 5, there is a clear gap between the trailing edge of the leading edge slat 710 and the main body 104 when in the deployed landing position.

Figure 9:
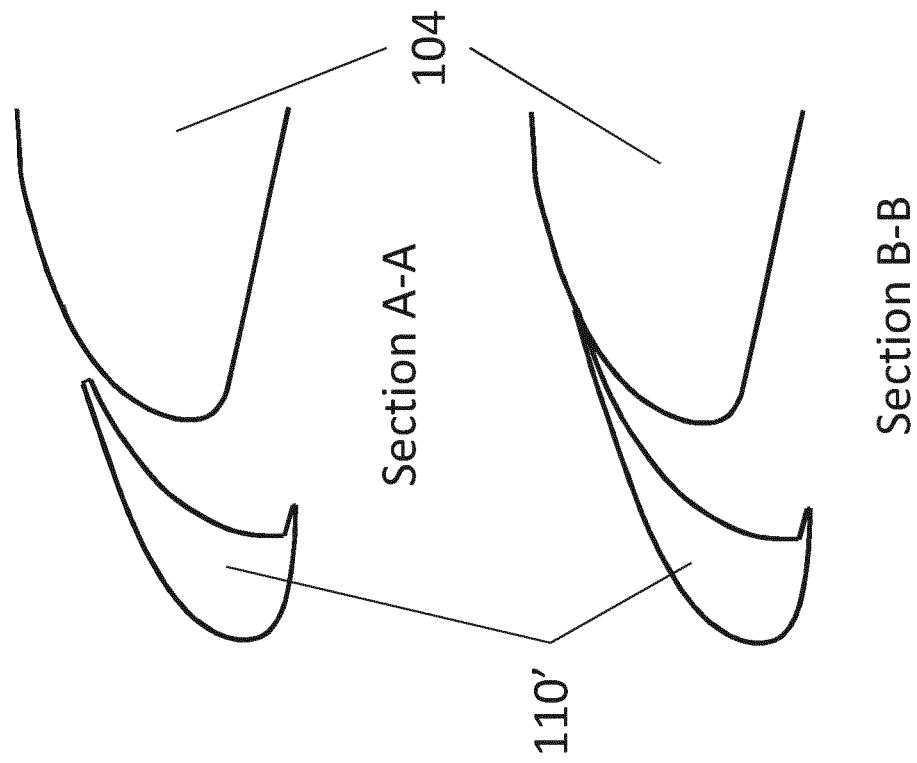
FIG. 9 shows cross-sectional views taken along various axes shown in FIG. 8.
Figure 8:
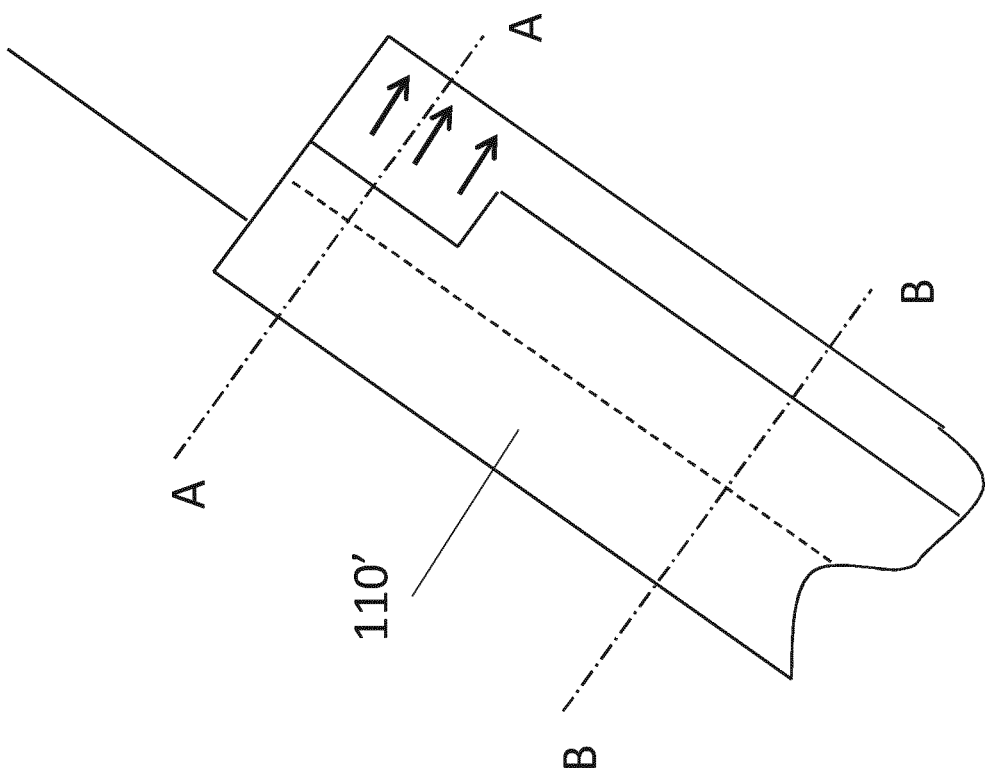
FIG. 8 shows a plan view of the first embodiment of the invention.

FIGS. 8 and 9 show a plan view of the first embodiment of the invention along with cross-sectional views taken along a first line A-A, showing the unsealed portion, and a second line B-B, showing the sealed portion. The leading edge portion 110' is in the deployed position. The plan view in FIG. 8 shows the leading edge slat in the deployed take-off position, and the arrows indicate the airflow which passes through the unsealed portion.

Figure 11:
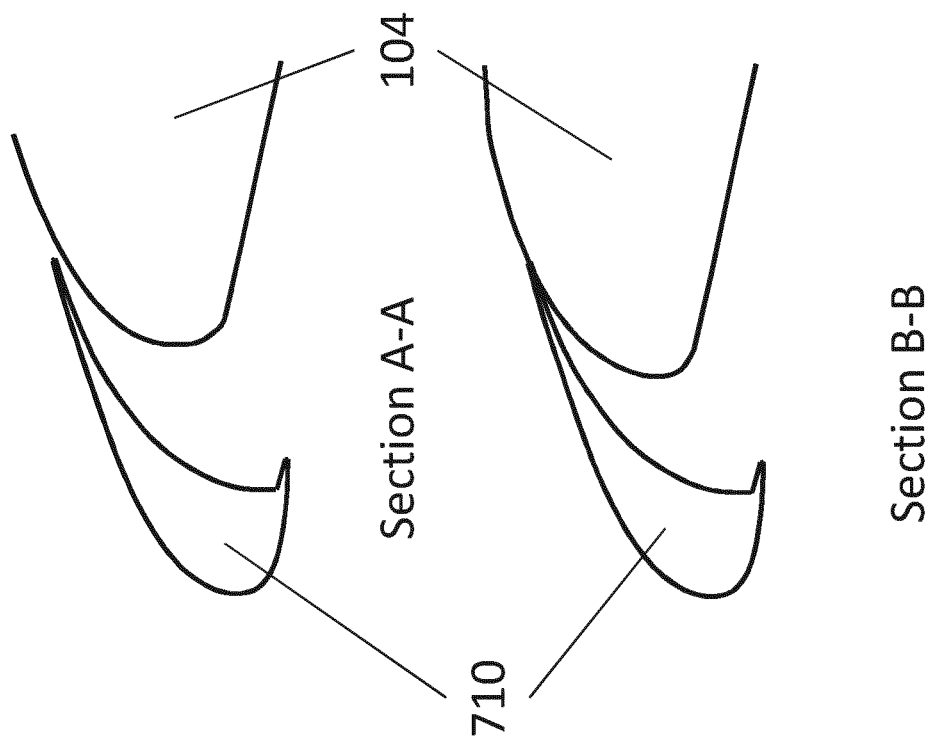
FIG. 11 shown cross-sectional views taken along various axes shown in FIG. 10.
Figure 10:
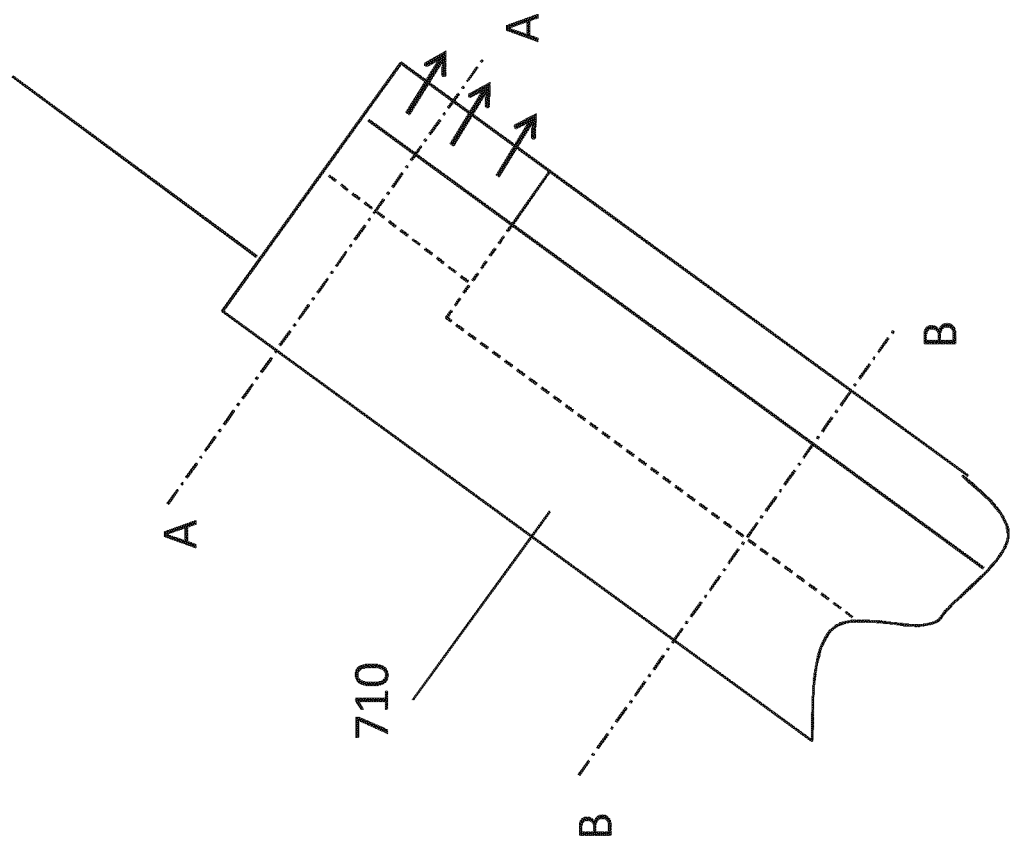
FIG. 10 shows a plan view of the third embodiment of the invention.

FIGS. 10 and 11 show a plan view of the second embodiment of the invention along with cross-sectional views taken along a first line A-A, showing the unsealed portion, and a second line B-B, showing the sealed portion. The leading edge portion 710 is in the deployed position. The plan view in FIG. 10 shows the leading edge slat in the deployed take-off position, and the arrows indicate the airflow which passes through the unsealed portion.

Alternative arrangements may be provided, as will be appreciated by a skilled person. For example, the leading edge slat may be located such that the unsealed portion is proximate to an alternative part of the wing. Such a location may be proximate to an underbody engine 108.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft wing comprising a leading edge slat and a fixed airfoil portion, the leading edge slat moveable between a stowed position and deployed position, wherein in the deployed position a trailing edge of the leading edge slat comprises a sealed portion and an unsealed portion, the sealed portion forming a seal with the fixed airfoil portion and the unsealed portion providing an airflow gap between the leading edge flap and the fixed airfoil portion, wherein the leading edge slat comprises an inboard end and an outboard end, the inboard end is located towards a root of the aircraft wing and the outboard end is located towards a tip of the aircraft wing, wherein the unsealed portion is located at the outboard end of the leading edge slat and proximate a part of the aircraft wing which disrupts airflow, and the sealed portion extends at least 75% of a spanwise length of the trailing edge of the leading edge slat, wherein the spanwise length extends from the inboard end to the outboard end of the leading edge slat.

2. The aircraft wing as claimed in claim 1, wherein the sealed portion comprises direct contact between the trailing edge of the leading edge slat and the fixed airfoil portion.

3. The aircraft wing as claimed in claim 1, wherein the profile of the fixed airfoil portion is shaped to create the airflow gap.

4. The aircraft wing as claimed in claim 1, wherein the leading edge slat is fully sealed against the fixed airfoil portion when in the stowed position.

5. The aircraft wing as claimed in claim 1, comprising a seal configured to seal the leading edge slat in the stowed position.

6. The aircraft wing as claimed in claim 1, further comprising a seal located to provide the sealed portion of the leading edge slat.

7. The aircraft wing as claimed in claim 6, wherein the seal is situated on one or both of the leading edge slat and the fixed airfoil portion.

8. The aircraft wing as claimed in claim 1, wherein the unsealed portion comprises the trailing edge of the leading edge slat being shaped to create the airflow gap.

9. The aircraft wing as claimed in claim 8, wherein the trailing edge of the leading edge slat is stepped to create the airflow gap.

10. The aircraft wing as claimed in claim 1, wherein the unsealed portion is configured to manipulate an airflow between the trailing edge of the leading edge slat and an associated portion of the fixed airfoil structure.

11. The aircraft wing as claimed in claim 10, wherein the unsealed portion comprises a vortex generator.

12. An aircraft comprising the aircraft wing as claimed in claim 1.

13. An aircraft wing comprising:
- a fixed wing extending in a spanwise direction and including an upper skin, and
- a leading edge slat extending in the spanwise direction and attached to a forward region of the fixed wing, wherein the leading edge slat includes an inboard end oriented towards a root of the fixed wing and an outboard end oriented towards a tip of the fixed wing, and the leading edge slat is moveable relative to the fixed wing between a stowed position and a deployed position which is forward of the stowed position;

wherein a trailing edge of the leading edge slat includes:
- a sealed portion configured to form a seal with the upper skin while the leading edge slat is in the deployed position, and
- an unsealed portion at the outboard end and separated from the upper skin by an airgap while the leading edge slat is in the deployed position, wherein the unsealed portion is spaced from the sealed portion along the spanwise direction of the trailing edge and proximate a part of the aircraft wing which disrupts airflow, wherein the sealed portion extends at least 75% of a spanwise length of the trailing edge of the leading edge slat, wherein the spanwise length extends from the inboard end to the outboard end, and wherein the airflow gap exists between the unsealed portion and the upper skin while the sealed portion is sealed against the upper skin.

14. The aircraft wing of claim 1, wherein the unsealed portion is at an end region of the trailing edge.

\* \* \* \* \*